May 25, 1937.  G. A. LYON  2,081,593
STEERING WHEEL CONSTRUCTION
Filed Oct. 19, 1934  3 Sheets-Sheet 2
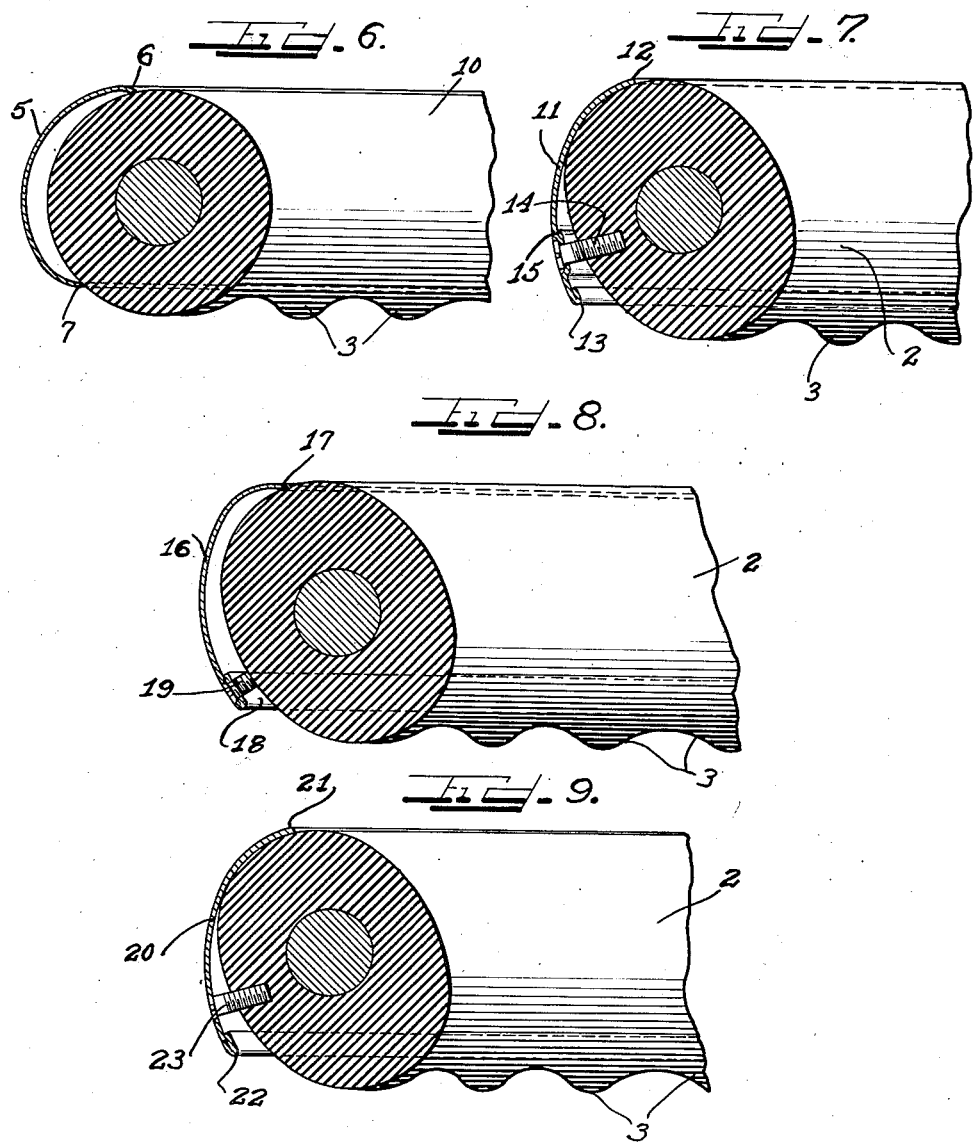
Inventor
George Albert Lyon.
by Charles W. Hills

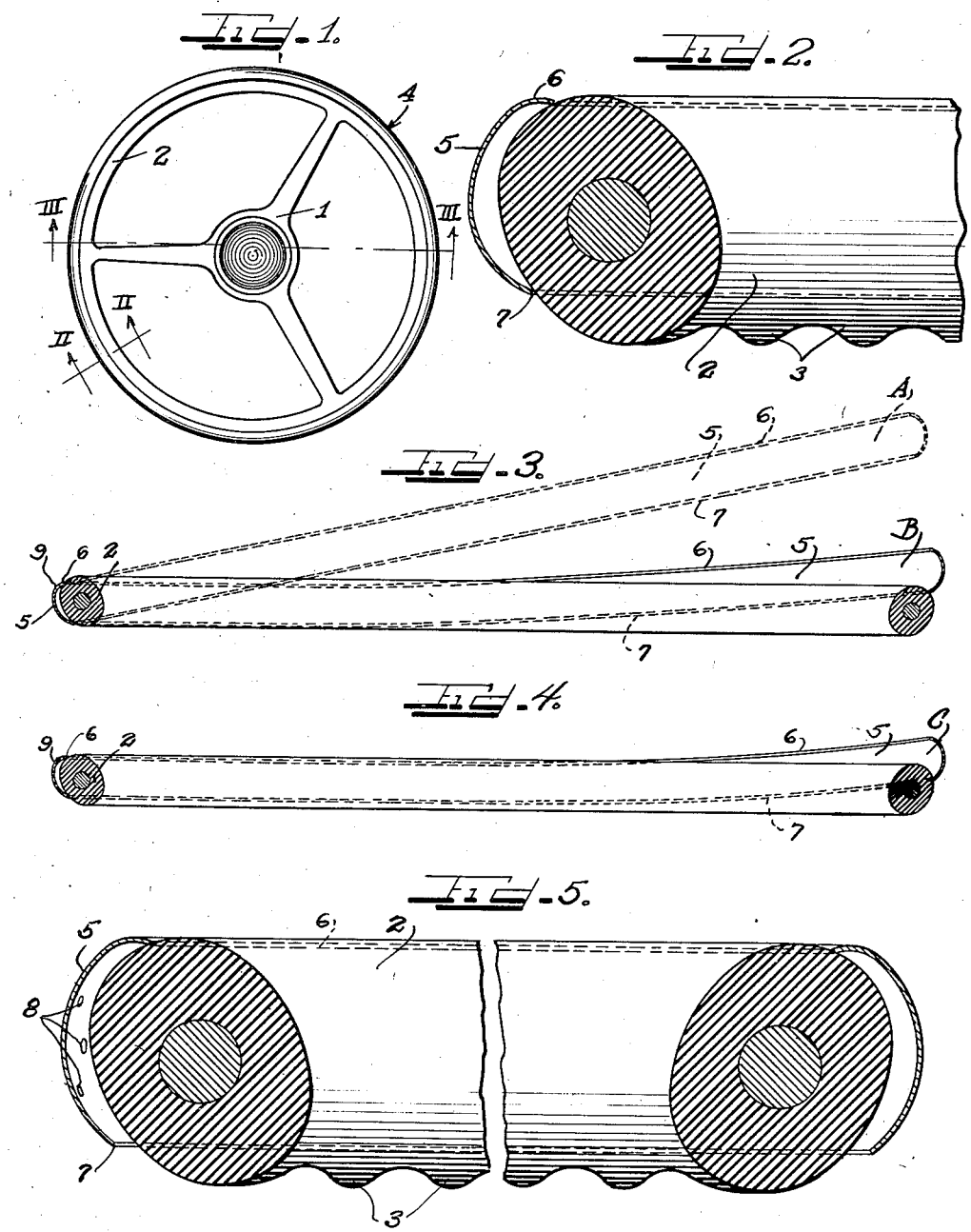

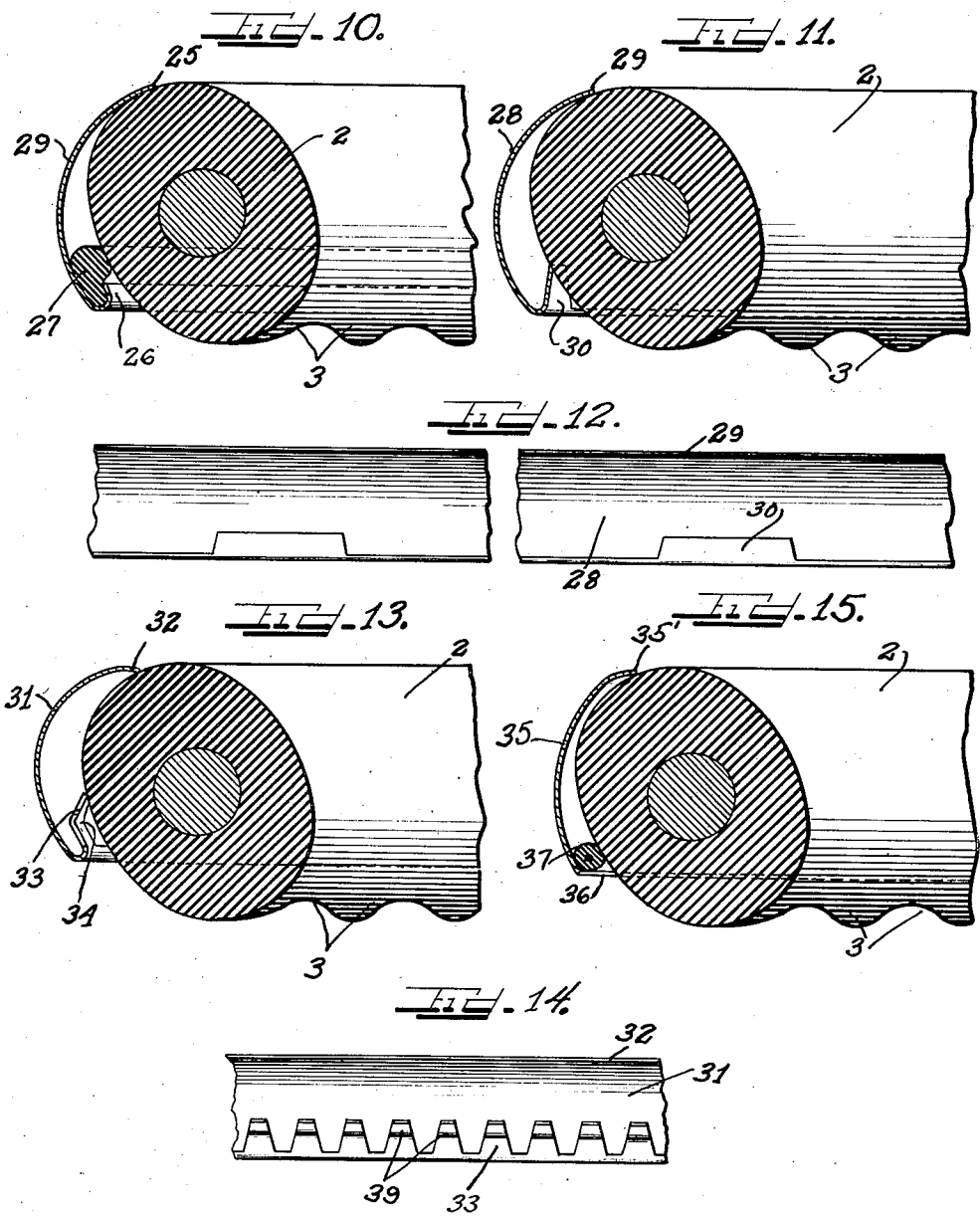

Patented May 25, 1937

2,081,593

UNITED STATES PATENT OFFICE 2,081,593

STEERING WHEEL CONSTRUCTION

George Albert Lyon, Detroit, Mich.

Application October 19, 1934, Serial No. 748,989

15 Claims. (Cl. 74—552)

This invention relates to improvements in steering wheel construction, highly desirable for use in connection with steering wheels and similar hand wheels for guiding or controlling vehicles or other mechanism, or parts thereof, although the invention may have other and various features and purposes, as will be apparent to one skilled in the art.

As pointed out in my copending application for Letters Patent entitled "Steering wheel construction", filed June 22, 1934, Serial No. 731,805, hard rubber, wooden, or all-metal steering wheels are objectionable. Rubber wheels are very sticky, tacky and uncomfortable to the hand. Wooden wheels have the same objection, and the finish on wooden wheels wears off after relatively short usage. Both wooden and rubber wheels cannot be made to harmonize with the interior appointments of an automotive vehicle, for example, to as great an extent as is desirable. All metal wheels are heavy, uncomfortable as to temperature, and prohibitively expensive to manufacture with the desired finish thereon.

Accordingly, it is desirable to provide a steering wheel with a smooth, clean, metallic surface for contact with the hands of a user, and, as also set forth in my aforesaid copending application, it has been found that this can best be done by way of applying a ring, band, bead or the like of metal or equivalent substance to the external surface of a wheel rim. Thus, economy in manufacture is maintained and the resultant wheel construction, if used in an automotive vehicle, harmonizes in any desirable manner with the other interior appointments, at the same time providing a construction that will maintain its pleasing appearance throughout considerable usage and will always present a clean, smooth surface for contact by the hands of a user.

While the present invention is capable of performing substantially all of the objects and providing substantially all of the advantages of the invention set forth and claimed in my aforesaid copending application, the invention herein set forth and claimed embodies certain refinements in construction and method of attachment not disclosed in my previous application.

It is an object of this invention to provide a steering wheel construction wherein a metallic band may be attached to the wheel in such a manner that the band will be in close proximity to the surface of the wheel along the edge portions of the band, yet the body of the band will be spaced from the wheel, the band being rolled into position and the wheel being standard without any special formation to accommodate the band.

It is also an object of this invention to provide an ornamental ring or band for attachment to a steering wheel, of such construction that the band may be initially passed over the maximum outer diameter of the wheel rim, and then subsequently rolled into engagement with the wheel rim, leaving the main body portion of the ring or band in spaced relationship to the outer surface of the rim.

It is also an object of this invention to provide a band having a metallic-like surface and preferably being transversely arcuate, and of such a size as to be engageable along a relatively short area with a wheel rim, and then the band may be worked both ways from the engaged area until the entire band is engaged over a surface of the wheel rim, the construction being such that after so being engaged the band is substantially an integral part of the wheel.

A further object of this invention is the provision of a band engageable over a wheel rim by a graduated pressing thereof away from an initial point of contact, the band being secured to the wheel rim after such pressing engagement thereover.

Still another object of this invention is the provision of a ring or band for attachment to a standard steering wheel of any desirable material, the band being of such character that it may be pressed over the outer maximum diameter of the wheel rim and when in this position will engage the steering wheel at points above and below said outer maximum diameter to retain the band upon the wheel.

It is also an object of this invention to provide a ring or band for attachment to a steering wheel rim, which band includes expansible means integral with or associated with the band in such a manner that the means may be expanded sufficiently to force the band over the outer maximum diameter of the wheel rim, and then the means contract into intimate engagement with the wheel rim below said maximum diameter.

Another aim of this invention is the provision of a smooth band of metal or equivalent material for attachment to a wheel rim, such as a steering wheel rim, for example, and which, when attached, is in somewhat spaced relationship to the wheel rim, the band having suitable ventilation apertures therein which may be in the form of an ornamental design or not, as may be desired.

Still another object of this invention is to provide a composite steering wheel construction including a standard steering wheel of any desirable material, with a band or ring of metallic or equivalent material circumscribing a portion of the wheel rim to afford clean, smooth contact with the hands of a user, the composite structure being preferably formed in one of the following ways:

(1) The band being continuous and endless, placed over the steering wheel by a gradual forcing of the band away from an initial point of contact, and then rolled into engagement with the outer rim surface above or below the maximum outside diameter of the wheel rim if the band is of such construction as to necessitate such rolling, or if the band is of a slightly different construction, as more fully apparent hereinafter, no rolling operation is necessary.

(2) The band may be in the form of a split ring, if so desired, placed around the wheel and then rolled into intimate engaging relationship with the wheel, the body portion of the band being preferably spaced slightly from the outer surface of the wheel.

(3) The band may be in the nature of a split ring with an inherent tendency to contract itself, and may be placed over the wheel rim by initially forcibly expanding the band and allowing the same to contract around the exterior of the wheel rim.

(4) The band may have an underturned resilient portion projecting inwardly to a material extent, and then the band may be forced over the wheel rim, causing the portion to be distorted outwardly toward the body portion of the band and resiliently engaging the surface of the wheel rim.

It is also an object of this invention to provide a new and novel method of attaching a band of the character set forth herein to a wheel rim, a steering wheel rim, for example, to form a composite structure.

It is also to be borne in mind that the band embodying principles of the present invention may be in the form such as to necessitate application by the manufacturer at the time of building up a composite steering wheel construction, or it may be in the form of an accessory sold and purchased separately at any desired time and merely pressed over the steering wheel rim to form a composite structure.

While some of the more salient features, characteristics and advantages of the present invention have been above pointed out, others will become apparent from the following disclosures.

The invention includes these and other features of construction, combinations of parts hereinafter described and shown in a preferred form in the drawings, and process steps hereinafter explained, as more particularly indicated by the claims.

On the drawings:

Figure 1 is a plan view of a composite steering wheel construction embodying principles of the present invention.

Figure 2 is an enlarged fragmentary transverse sectional view of the structure shown in Figure 1, taken substantially as indicated by the line II—II of Figure 1, and illustrating the composite structure completed.

Figure 3 is an enlarged transverse central sectional view taken substantially as indicated by the line III—III of Figure 1, with the central portion of the steering wheel removed, illustrating initial steps in the application of the band to the steering wheel rim.

Figure 4 is a view similar to Figure 3 illustrating an advanced stage in the application of the band to the wheel rim.

Figure 5 is a greatly enlarged central sectional view similar to Figures 3 and 4, illustrating the next to the final stage in applying the band to the wheel rim.

Figure 6 is a sectional view similar to Figure 2, illustrating the application of a band embodying principles of the present invention to a steering wheel rim of substantially circular cross-section.

Figure 7 is a view similar to Figure 6 showing a different form of construction.

Figure 8 is a view similar to Figure 7 showing a still different form of construction.

Figure 9 is a view similar to Figure 8 showing another form of construction.

Figure 10 is a view similar to Figure 9 showing a band construction including a resilient member for engagement with a wheel rim.

Figure 11 is a view similar to Figure 10 showing a band construction including substantially resilient teeth for engagement with a wheel rim.

Figure 12 is a substantially development view of the band structure shown in Figure 11, showing the band laid out substantially in the flat, the view being an elevation of the interior of the band.

Figure 13 is a view similar to Figure 11, illustrating another form of a toothed band.

Figure 14 is a fragmentary elevational view of the interior of the band shown in Figure 13.

Figure 15 is a view similar to Figure 13, illustrating still another form of construction.

As shown on the drawings:

At the outset, it may be best to note that the plan view of Figure 1 is so nearly illustrative of the composite steering wheel constructions shown in the other views, except, of course, for obvious variations, that it is not deemed necessary herein to illustrate the other composite constructions in kind.

While the composite steering wheel construction in the instance of Figure 1 and several of the other figures of the drawings is disclosed as including a wheel rim with a completely annular bead or band disposed therearound, it will be obvious that such bead or band may or may not have the ends thereof secured together to form a complete ring-like structure, but may, if so desired, extend only a portion of the way around the periphery of the wheel rim, and may, if so desired, be in the form of one or more annular portions with spaces therebetween, depending upon the exigencies of particular circumstances.

It is also to be understood that the band may be in the form of a split ring, forcibly expanded over the wheel rim and then permitted to contract into tight engagement with the wheel rim. The band may also be a continuous, endless band applied to the wheel rim by application of pressure away from an initial point of contact until the entire band is forced over the wheel rim. The preferable form for the band, however, is an initially split ring with the ends thereof butt-welded prior to the application of the band to the wheel.

Further, it is to be distinctly understood that while the steering wheel proper is shown in certain figures as being of a substantially oval cross-section and in other figures as being of circular cross-section, the bands or rings applied to the wheel rims are not limited to the particular wheel rim with which a particular band may be illustrated herein, but any of the forms of the bands shown and described herein is applicable equally as well to a wheel rim of substantially any cross-sectional character desired.

In the illustrated embodiment of the present invention, seen in Figures 1 to 5, inclusive, there is shown a steering wheel 1, which may be of any standard construction, having a wheel rim 2, also of any desirable standard construction or any preferable cross-sectional characteristic or shape. In this instance, the cross-sectional shape of the rim is substantially oval, and along the undersurface thereof the rim is provided with the usual finger humps 3. An annular band, generally indicated in Figure 1 by reference numeral 4, is shown attached to the outer surface of the wheel rim 2. This annular band is preferably of relatively thin metallic stock, but may, of course, be of any suitable or equivalent material. As best seen in Figures 2 and 5, the band 4 does not completely encircle the wheel rim in a transverse direction, but preferably only overlies the upper outer portion of the wheel rim where it is in position to present a smooth, clean surface for contact by the hands of a user.

As best seen in Figures 2 and 5, the band 4 includes a transversely arcuate body portion 5 having an inwardly turned upper margin 6 and an inwardly turned lower margin 7. In this instance, the upper margin 6 projects inwardly beyond the lower margin 7, but it will be understood that either margin may project inwardly farther than the other as may be deemed most desirable. If the upper margin projects inwardly the farthest, the band is preferably pressed down over the wheel rim from above, while if the lower margin projects inwardly the most, the band is preferably attached by pressing it over the wheel rim upwardly from below. The band is somewhat flexible in nature, and it will be noted that the lower margin 7 has an internal diameter somewhat less than the maximum outside diameter of the wheel rim 2. The band, however, can be gradually forced over the wheel rim so as to cause the margin 7 to pass by the outside maximum diameter of the wheel rim while the margin 6 intimately engages the wheel rim on the opposite side of the maximum diameter.

As illustrated in Figure 5, the body portion 5 of the band may, if so desired, be provided with ventilation apertures 8 therein, these apertures being arranged as shown in the form of a desirable design or in any other desirable manner. When attached, the body portion 5 of the band is preferably in spaced relationship to the outer surface of the wheel rim so that there is ample room for free circulation of air between the wheel rim and the body portion of the band.

The band is preferably formed in endless style prior to its application to the rim 2. A preferable method of applying the band to the rim is illustrated best in Figures 3 to 5, inclusive. The band is first preferably applied to the rim at an initial, relatively small area of contact, designated 9 in Figures 3 and 4, and the band is held in tight engagement with the rim at this initial point of contact. In this position, the upper margin 6 is somewhat lower than it will be when the band is ultimately in complete engagement with the rim. When engaged with the rim at the initial point of contact, the entire band will be in the dotted line position designated A in Figure 3. While holding the band in tight engagement with the rim at the initial point of contact, pressure is applied to the band at relatively small spaced intervals, preferably on both sides of the point of contact, gradually working the band over the rim away from the point of contact. After one or more applications of pressure upon each side of the band, the band will then have assumed the position designated B in Figure 3, the opposite portion of the band from the point 9 being still above the rim. Continued working of the band away from the point 9 results in the band assuming the position designated C in Figure 4. After this position, it is a simple expedient to force the opposite or elevated portion of the band downwardly over the rim. This working or forcing operation of the band is necessary due to the fact, as above stated, that the lower margin 7 of the band is of slightly less diameter than the maximum outside diameter of the rim. After the band has been forced over the rim, the band will then be in the position seen in Figure 5. It will be noted that during the forcing of the band over the rim, the margin 6 of the band gradually works itself upwardly adjacent the initial point 9 so that it assumes intimate contact with the rim at a higher level than at which it was started.

With the band worked over the rim, it will be noted that the lower marginal portion 7 is in slightly spaced relationship from the rim (Figure 5), and so a rolling or kicking operation is preferably utilized to turn this marginal portion 7 into intimate contact with the rim as the same is seen in Figure 2.

With the completion of the rolling or kicking operation, the band is in firm engagement with the rim, both marginal portions 6 and 7 being in intimate engagement with the rim, and any pressure applied tending to force the band off of the rim would cause the marginal portion 7 to bite into the rim, securely holding the band in position with these marginal portions engaged with the rim on opposite sides of the maximum outside diameter of the rim. The body portion 5 of the band will still be in spaced relationship to the outer surface of the rim, allowing sufficient air circulation through the openings 8 to adequately ventilate the band.

The intimate engagement of the margins 6 and 7 with the rim effectively prevents the turning of the band relatively to the rim, resulting in a composite construction operable as a unit. The rolling operation may be performed very expeditiously and very economically, giving a resultant composite steering wheel construction that harmonizes with the interior appointments of a vehicle, and that is clean, smooth and cool to the touch. In other words, such a composite steering wheel construction is not fatiguing to the hands, even after long usage, and there will be no tendency for the driver to remove his hands from the wheel due to tiresome or unpleasant feeling caused by the wheel.

In Figure 6, I have shown the same form of band, with the body portion 5, the upper marginal portion 6, and the lower marginal portion 7 attached in the manner above described to a wheel rim 10 having a substantially circular cross-section. The particular cross-section or characteristics of the wheel rim does not affect the use of the band or its method of attachment.

In Figure 7, I have shown a different form of band having a transversely arcuate body portion 11, with an inwardly extending upper margin 12 and a lower margin 13 folded upon itself in a reverse bend. The margin 13 is preferably of slightly less diameter than the maximum outside diameter of the rim. The rim in this instance is the same rim 2 above described in connection with Figures 1 to 5, inclusive. The margin 13 is provided with a reverse bend to prevent marring of the surface of the wheel rim when the band is forced downwardly over the wheel rim. No rolling or kicking operation is necessary with the band 11, but means are provided for firmly holding the band to the steering wheel in the nature of one or more bolts 14 threadedly engaged into the wheel rim itself, with the heads of the bolts seated in a countersunk groove 15. This groove 15 may extend entirely around the band 11, or may be in the form of a recess sufficiently large to accommodate the head of the screw 14. Smooth contact is afforded to the hands of the user, and the engagement of the bolts 14 is sufficient to cause the upper surface 12 to tightly engage the steering wheel, the lower portion of the band being held in spaced relationship to the steering wheel by means of the bolts.

In Figure 8 I have shown another construction wherein the band comprises a body portion 16, an upper margin 17, and a lower reversely bent margin 18 engaged over a wheel rim 2. The lower marginal portion 18 is preferably slightly smaller in diameter than the maximum outside diameter of the wheel rim. The band is pressed downwardly over the upper portion of the wheel rim, either with one pressing or, as above explained, by working away from an initial point of contact, and after being pressed over the wheel rim, it is held in position by means of a bolt 19. In this instance, the bolt 19 merely abuts the outer surface of the wheel rim, the inner end of the bolt being shaped to provide smooth abutting contact. At the reversely bent marginal portion 18, the outer thickness of metal is countersunk to accommodate the head of the bolt, and the inner thickness of the metal is apertured and internally threaded. Accordingly, when the bolt is tightened against the wheel rim, the band will be forced outwardly in the lower portion thereof away from the wheel rim, causing the upper marginal portion 17 to assume very intimate engagement with the wheel rim. Obviously, it would be impossible to remove the band from the wheel rim without loosening the bolt 19, and equally as obviously, any desirable number of bolts 19 may be utilized in securing the band to the rim.

Another composite construction including a band engaged to a rim by means of one or more bolts is shown in Figure 9. In this instance, the same rim 2 is illustrated, and the band comprises a body portion 20, an upper margin 21, and a lower reversely bent margin 22. As is the case with the other forms of the composite construction, the upper margin 21 engages the wheel rim above the maximum outside diameter thereof, and the reversely bent lower margin 22 which is preferably somewhat less in diameter than this maximum outside diameter of the rim engages below said rim diameter. In this instance, the band is provided with a countersunk opening therein of suitable size to accommodate the head of a bolt 23, which bolt is threadedly engaged in the wheel rim 2. The tightening of the bolt results in a drawing inwardly of the lower portion of the band, causing the upper marginal portion 21 to firmly grip the wheel. The band may be removed from the wheel by first removing the threaded securing means and then forcing the margin 22 upwardly over the maximum outside diameter of the wheel rim. This process will not result in the marring of the surface of the wheel rim due to the reverse bend of the marginal portion 22.

In Figure 10, I have shown the same type of steering wheel 2, equipped with a band having a body portion 24, an inwardly turned upper margin 25 and a lower margin 26 reversely bent in spaced relationship to the body portion 24. Clamped between the body portion and the inwardly turned margin 25 is an annular resilient member 27 preferably of rubber or equivalent substance, designed to engage the outer surface of the wheel below the maximum outside diameter thereof. The resilient insert 27 is sufficiently flexible in nature to permit the forcing of the band downwardly over the wheel rim with a consequent distortion of the insert. Immediately upon forcing the band downwardly over the wheel rim, the insert will effectively grip the wheel rim and hold the band thereupon.

In Figures 11 and 12, I have shown the wheel rim 2 equipped with a band having a body portion 28, an upper inwardly extending margin 29 engaged with the surface of the wheel rim, and a plurality of spaced teeth 30 inwardly turned and extending at an angle to the arcuate body portion 28. These teeth 30 are preferably few in number and, as shown, are relatively wide, being positioned at relatively widely spaced intervals. The teeth 30 are sufficiently resilient to permit forcing them over the maximum outside diameter of the rim, and these teeth, as seen more clearly in Figure 11, extend inwardly at a proper angle for biting engagement with the rim below the maximum outside diameter thereof. Adequate ventilation openings are provided between the teeth. Any desirable number of such teeth may be utilized, but the preferable number is four spaced substantially ninety degrees apart. Of course, after the band has been once applied to the wheel rim, it is substantially impossible to remove the band without destructive action either to the band or the rim. The band 28 may be applied to the rim very efficiently in the manner above described in connection with Figures 1 to 5, inclusive.

In Figures 13 and 14, I have shown a still different form of band for application to a wheel rim 2. The band in this instance includes a transversely arcuate body portion 31 having an inwardly turned upper margin 32 for tight engagement with the wheel rim above the maximum outside diameter thereof, and also a plurality of inwardly turned teeth 33 at relatively narrow spaced intervals. These teeth are preferably bent outwardly in an intermediate portion thereof as indicated at 34. Such bending reduces the internal diameter of the nibs of the teeth and causes these nibs to extend inwardly at an angle suitable for biting engagement with the surface of the wheel rim beneath the maximum outside diameter. The lessening of the internal diameter of the nibs of the teeth permits the teeth, which are substantially resilient in character, to be forced over the maximum outside diameter of the wheel rim in the manner above described in connection with Figures 1 to 5, inclusive. After such placing of the band over the wheel rim, no rolling or kicking operation is necessitated, and the teeth effectively bite into the surface of the wheel rim, preventing removal of the band. Adequate ventilation openings are provided between the teeth.

Figure 15 illustrates a still different form of band applied to a wheel rim 2. In this instance, the band comprises a body portion 35 having a rather sharply inwardly turned upper margin 35' for intimate engagement with the surface of the rim. The lower margin 36 of the band is spaced from the wheel rim, and just within this margin is an annular resilient contractible element 37. The lower margin 36 may be turned inwardly to a sufficient extent to insure the holding of the contractible element 37. This contractible element preferably comprises an inner spring wire covered with a wrapping of rubber or some similar resilient material, and the member is so arranged as to tightly embrace the wheel rim below the maximum outside diameter thereof. This member may either be provided as a part of the band prior to the forcing of the band over the wheel rim, or may be stuffed into the space between the band and rim after the band has been placed in position. If the latter method is utilized, the band is preferably kicked inwardly after application to turn the lower margin 36 and to turn the upper margin 35' inwardly to a greater extent, the body portion 35 of the band being somewhat flattened in this kicking or rolling operation.

From the foregoing, it will be apparent that I have provided a novel composite steering wheel construction including a steering wheel of any standard or desirable construction equipped with a novel band. It will also be noted that the composite steering wheel may be made completely at the factory, or the band portion may be sold as an accessory for subsequent attachment to the wheel at any desirable time. In either way, the principles of the present invention are involved in the resultant construction and in the band itself. It is also obvious that the present invention may be built up in various ways, shapes and styles, but always in an expeditious and economical manner.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a composite steering wheel construction, a finished steering wheel including a rim of arcuate cross-section, and an annular metallic-like surfaced member overlying the upper and outer portion of said wheel rim, said member having its body portion spaced from said wheel rim, and said member also having clean cut edges with the upper and lower marginal portions extending inwardly to cause said edges to engage said wheel rim substantially normally to the rim, said edges being one on each side of the maximum outside diameter of said rim.

2. In a composite steering wheel construction, a finished steering wheel including a rim of arcuate cross-section having a smooth exterior surface, and a metallic-like surfaced member overlying a portion of said rim, said member having edge portions extending away from the body portion of the member to engage said wheel rim substantially normally thereto.

3. In a composite steering wheel construction, a finished wheel rim having a substantially smooth surface and arcuate cross-section, and a metallic band-like member covering a portion of said surface, said member having clean cut edge portions extending away from the body portion of the member to engage said surface and leave the body portion free from said surface.

4. In a composite steering wheel construction, a wheel rim having a substantially smooth surface, and a band-like metallic member overlying a portion of said surface, said member having a transverse contour substantially in keeping with the adjacent rim surface, but spaced therefrom, and the margins of said member being turned towards said rim to provide direct substantially normal engagement of the edges of said member with the rim surface.

5. As an article of manufacture, an endless metallic band of arcuate cross-section and plain edges for engagement over a wheel rim of arcuate cross-section in circumscribing relationship, said band having an edge diameter slightly less than the maximum outside diameter of the rim and being shaped to engage over said rim with an edge of the band on each side of said maximum rim diameter.

6. As an article of manufacture, an endless resilient metallic band of arcuate cross-section having a plurality of inwardly turned teeth, and said band being adapted to be engaged with and then worked over an arcuate rim away from the point of engagement until said teeth are in position to resist removal of the band.

7. In a composite steering wheel construction, a wheel rim, a metallic-surfaced band overlying a portion of the surface of said rim, said band having an indentation therein, and securing means extending through said band in said indentation into engagement with said rim.

8. In a composite steering wheel construction, a wheel rim, a metallic band overlying the upper outer surface of said rim, said band having an indentation therein, and securing means seated in said indentation and extending through said band into said rim.

9. In a composite steering wheel construction, a wheel rim, a metallic band overlying a surface of said wheel rim, said band being arcuate in cross-section with an edge thereof in intimate engagement with said rim, the other edge of said rim being inwardly reversely bent, and means threadedly engaged in said other edge and abutting said rim to force said other edge outwardly and cause a firm grip with said rim of said first edge.

10. In a composite steering wheel construction, a wheel rim, a metallic band arcuate in cross-section disposed over a surface of said rim with an edge in contact with said rim, said band having a countersunk opening therein adjacent the opposite edge thereof, and a headed member in said opening and threadedly engaged in said rim.

11. In a composite steering wheel construction, a wheel rim, a transversely arcuate metallic band covering a surface of said rim with an edge thereof in engagement with said rim, and relatively widely spaced teeth inwardly turned from the opposite edge of said band and engaging the surface of said rim on one side of the maximum diameter of the rim.

12. In a composite steering wheel construction, a wheel rim, a transversely arcuate band covering a portion of the surface of said rim, said band carrying a plurality of underturned teeth extending inwardly at an angle to the body of said band, and each of said teeth having a bend therein towards the arc of the body portion of the band to lessen the internal diameter of the teeth and cause them to meet the surface of said rim in biting engagement.

13. As an article of manufacture, an endless transversely arcuate band for disposition over a transversely arcuate wheel rim, said band having a plurality of underturned teeth along an edge thereof, each of said teeth being outwardly arced in an intermediate portion towards the arc of said band causing the ends of the teeth to project inwardly at an angle for biting engagement with a rim and lessening the internal diameter of the teeth circle to permit said band to be pressed over a rim.

14. In a composite steering wheel construction, a wheel rim, a transversely arcuate metallic band engaged over a surface of said rim with one edge of the band contacting the rim on one side of the maximum diameter of the rim, and a resilient contractible member disposed between said band and said rim on the opposite side of said maximum diameter.

15. In a composite steering wheel construction, a finished steering wheel having a rim of arcuate cross-section, and an endless metallic band of arcuate cross-section having the edges thereof each of slightly less diameter than the maximum diameter of said rim, said band being sufficiently resilient to be pressed over the outer side surface of said rim with the edges of the band on opposite sides of the maximum diameter of the rim.

GEORGE ALBERT LYON.